(12) United States Patent
Lipsey, III (10) Patent No.: US 7,137,641 B1
(45) Date of Patent: Nov. 21, 2006

(54) TRAILER APPARATUS

(76) Inventor: William Thomas Lipsey, III, No. 3 Moll Rd., Sunflower, MS (US) 38776

(*) Notice: Subject to any disclaimer, the term of this patent is extended or adjusted under 35 U.S.C. 154(b) by 3 days.

(21) Appl. No.: 10/777,341

(22) Filed: Feb. 12, 2004

Related U.S. Application Data (60) Provisional application No. 60/474,514, filed on May 30, 2003.

(51) Int. Cl.
*B60D 1/24* (2006.01)

(52) U.S. Cl. .................................. 280/411.1; 280/408

(58) Field of Classification Search ................ 280/408, 280/411.1
See application file for complete search history.

(56) References Cited

U.S. PATENT DOCUMENTS

| | | | |
|---|---|---|---|
| 1,283,591 A | 11/1918 | Steendahl | |
| 1,416,613 A | 5/1922 | Colardeau | |
| 3,185,108 A | 5/1965 | Muller | |
| 3,288,491 A | 11/1966 | Ellerd | |
| 3,290,058 A | 12/1966 | Ellerd | |
| 3,294,417 A * | 12/1966 | March | 280/408 |
| 3,337,234 A * | 8/1967 | Ishizuka | 280/99 |
| 3,637,236 A * | 1/1972 | Shimoji et al. | 280/419 |
| 3,806,160 A * | 4/1974 | Duerksen | 280/444 |
| 3,820,811 A * | 6/1974 | Lapham | 280/99 |
| 4,382,607 A * | 5/1983 | Voight | 280/408 |
| 4,934,726 A * | 6/1990 | Daenens et al. | 280/408 |
| 5,700,023 A * | 12/1997 | Picard | 280/426 |
| 6,193,257 B1 | 2/2001 | Lutz | |

* cited by examiner

*Primary Examiner*—Lesley D. Morris
*Assistant Examiner*—L. Lum
(74) *Attorney, Agent, or Firm*—Garvey, Smith, Nehrbass & North, L.L.C.; Charles C. Garvey, Jr.

(57) ABSTRACT

A trailer train apparatus is disclosed that is comprised of a plurality of trailers connected end-to-end. At least some of the trailers are wheeled trailers with steerable wheels. The train includes opposing end trailers that each have tongues that enable the train to be towed from either end. Links join the steerable axle supports (or wheel supports) of some chassis with other chassis so that when an end chassis is steered with its tongue, the other chassis are also steered.

39 Claims, 6 Drawing Sheets

TRAILER APPARATUS

CROSS-REFERENCE TO RELATED APPLICATIONS

Priority of U.S. Provisional Patent Application Ser. No. 60/474,514, filed May 30, 2003, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to trailers and to trains of a plurality of trailers and more particularly to an improved trailer train arrangement that enables the train to be towed from either end. Even more particularly the present invention relates to a trailer train apparatus wherein each trailer of the train has a chassis, some having front and rear steerable axles and wherein intermediate chassis can be wheelless (or have only one pair of wheels), being pivotally attached to the upper deck of wheeled chassis on opposing ends of the wheelless chassis.

2. General Background of the Invention

Trains that include a plurality of connected trailers towed by a single tractor or like powered vehicle are commonly used in factories, manufacturing plants, warehouses, and other industrial facilities for transporting loads or load modules from one location to another.

At times, the trailer trains must operate in a confined space, wherein sharp turns are required. In some situations, the trailer train must execute a u-turn requiring valuable factory or warehouse floor space to accommodate the necessary turning radius.

Various trailer train arrangements have been patented. The following table lists patents that disclose trailer trains and related art.

TABLE

| PATENT NO. | TITLE |
| --- | --- |
| 1,283,591 | Toy Train and Method of Making the Same |
| 1,416,613 | Train of Vehicles |
| 3,185,108 | Pedestrian Carrier |
| 3,288,491 | Articulated Cargo Vehicle |
| 2,190,058 | Modified Articulated Vehicle |
| 3,637,236 | Coupling Device of Trailers |
| 6,193,257 | Steering System for a Multiple Vehicle Train |

The prior art trailer train devices suffer in that they can be towed in one direction only.

BRIEF SUMMARY OF THE INVENTION

The present invention provides an improved trailer train apparatus that includes a train having a plurality of trailers connected in sequence at least some trailers having a chassis and a plurality of wheels attached to the chassis. Some of the trailers have front and rear steerable wheels.

Each axle is attached to its chassis at a pivotal connection. Each axle has respective left and right side portions that are on opposing sides of the pivoting connection.

A steering rod or link attaches to the left side of an axle of one trailer and to the right side of an axle of an adjacent trailer so that when one trailer is steered by steering one of its axles, it's link will steer the other trailer. Two of the plurality of trailers are at opposing ends of the train. The two end trailers each have a tongue that enables the train to be towed and steered by either of the tongues of the "end" trailers.

Each tongue is connected to an axle support that has an axle and opposed steerable wheels that rotate with respect to the pivot with the axle support.

The axle support can be a beam that is pivotally attached to a chassis and that carries an axle and a pair of wheels mounted to the ends of the axles.

Each chassis preferably has a generally rectangular periphery. In one embodiment, the chassis can be an elongated chassis that has a length that is much greater than its width.

The wheels are mounted upon supports (e.g. axles) that can extends beyond the periphery of the trailer chassis to which it is attached during use. Likewise a wheel can extend beyond the periphery of the chassis to which it is attached (e.g. see FIG. 3).

In the preferred embodiment, the pivot point where the two chassis are connected is directly in line with the pivot point of the axle that is supporting the two connected chassis.

The steering rods must continue from the axle at one end of the train to the axle at the other end of the train alternating their connection to the axles from right to left at each axle.

The size, shape and number of the chassis is inconsequential, provided that at each connection at one of the chassis to another, both chassis share the same running gear and this running gear can be pivoted in line with the pivot point where the two chassis are connected.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 6:
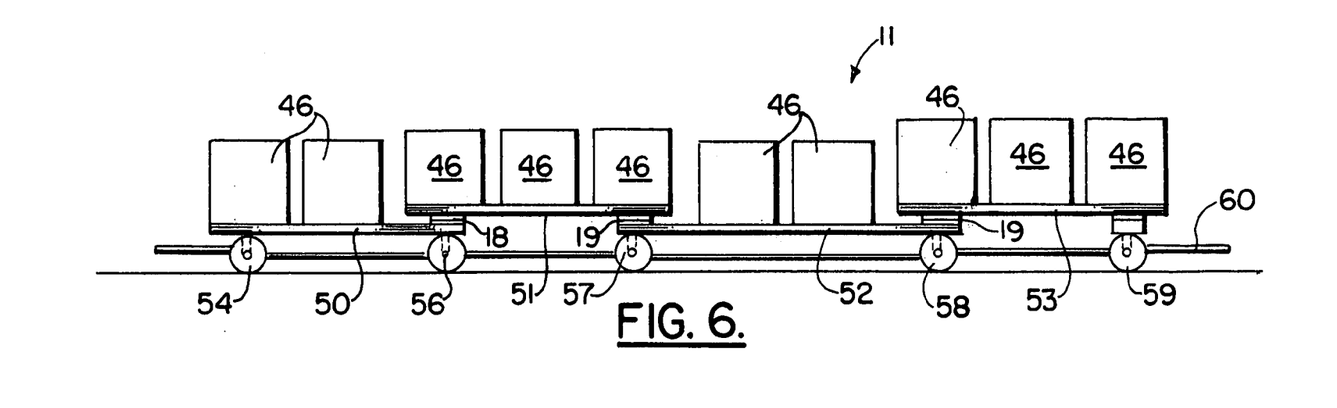
FIG. 6 is a schematic, elevation view showing a trailer train that includes four chassis, and including both wheeled and wheelless chassis.
Figure 7:
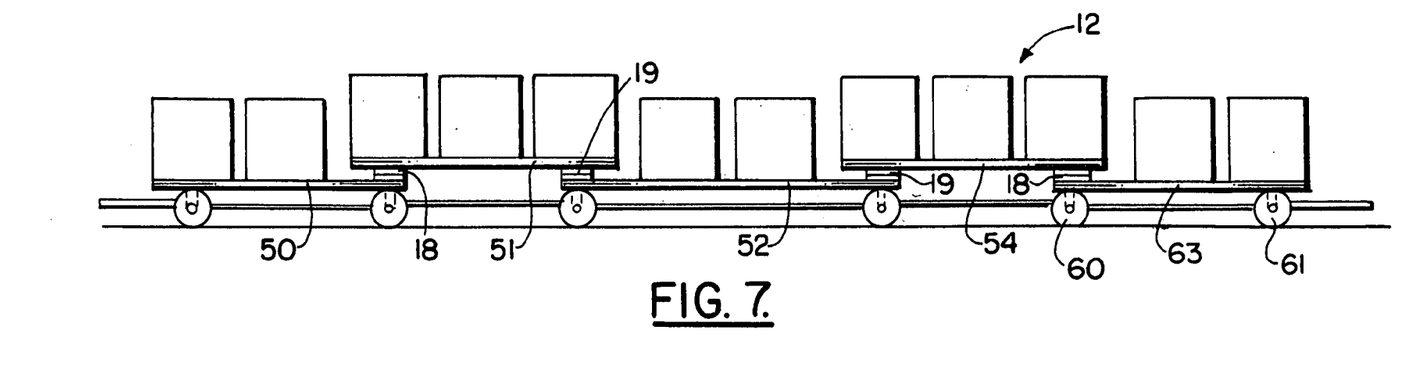
FIG. 7 is a schematic elevation view of a trailer train that includes five chassis, including three that are wheeled and two that are wheelless.

FIGS. 1–5 show a first embodiment of the apparatus of the present invention designed generally by the numeral 10. Trailer train 10 in FIGS. 1–5 is comprised of three chassis including an end chassis 13, an end chassis 14, and a center chassis 15. In FIG. 6, a trailer train 11 has four chassis. In FIG. 7, a trailer train 12 has five chassis.

In FIGS. 1–5 the end chassis 13 has a trailer tongue 16 that can be used to tow and steer the train 10. The end chassis 14 provides a tongue 17 that can be used to tow and steer the train 10 from the opposite direction. The trailer train 10 can thus be towed and steered in either direction.

Center chassis 15 is a wheelless chassis that attaches at pivot points 18, 19 respectively to the chassis 13, 14. Pivot point 18 joins one end portion of chassis 15 to chassis 13. Pivot point 19 joins the opposing end portion of chassis 15 to chassis 14.

The chassis 13 has axle supports 20, 24 that are pivotally attached to chassis 13. Axle support 20 has spaced apart spindles 21 with wheels 22 mounted at the spindles 21 end portions of axle support 20. A pivotal connection 23 joins axle support 20 to chassis 13. Axle support 24 has spindles 25 that have wheels 26. Pivotal connection 27 joins axle support 24 to chassis 13.

A steering rod 28 is used to connect axle support 20 to axle support 24. Connections 29, 30 on opposing sides of the respective pivotal connections 23 and 27 join steering rod 28 to axle supports 20 and 24. When viewed from tongue 16, pivotal connection 29 joins steering rod 28 to axle support 20 on the left side of pivotal connection 23. Pivotal connection 30 joins steering rod 28 to axle support 24 on the right side of pivotal connection 27 (see FIG. 1).

Figures 1, 2:
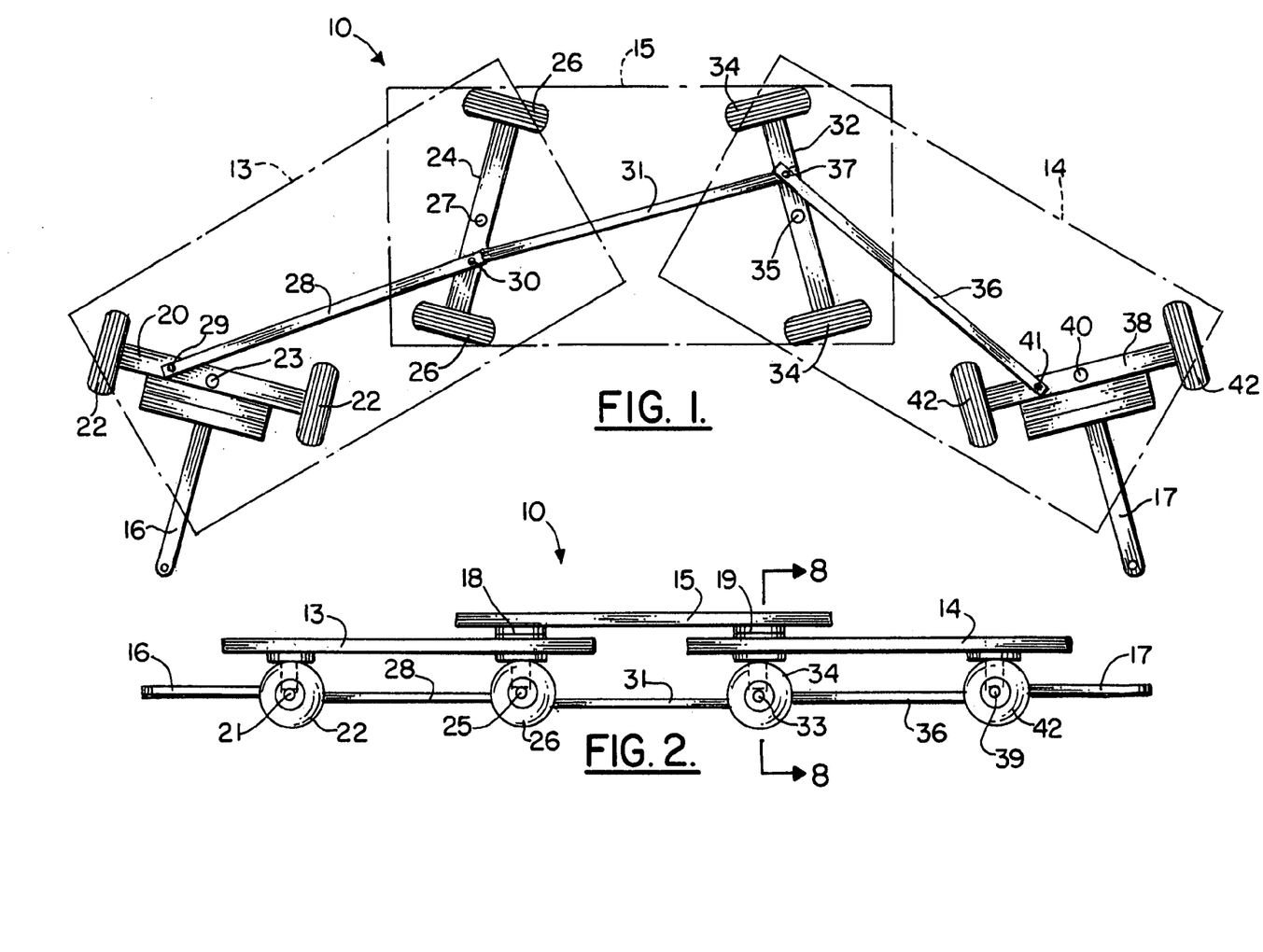
FIG. 1 is a plan, schematic view of the preferred embodiment of the apparatus of the present invention.
FIG. 2 is a schematic elevation view of the preferred embodiment of the apparatus of the present invention and showing a trailer train of two wheeled chassis and one wheelless chassis.

The pivot 18 that connects chassis 13 and 15 is preferably directly in line with the pivot of the axle support 24 that is supporting the two connected chassis 13 and 15.

The same configuration is used for the pivot 35 in FIG. 1 connecting the chassis 14 and 15. In the other embodiments of FIGS. 5, 6 and 7, the pivot point where two chassis are connected is preferably directly in line with the pivot point of the axle that is supporting the two connected chassis.

Figures 3, 4:
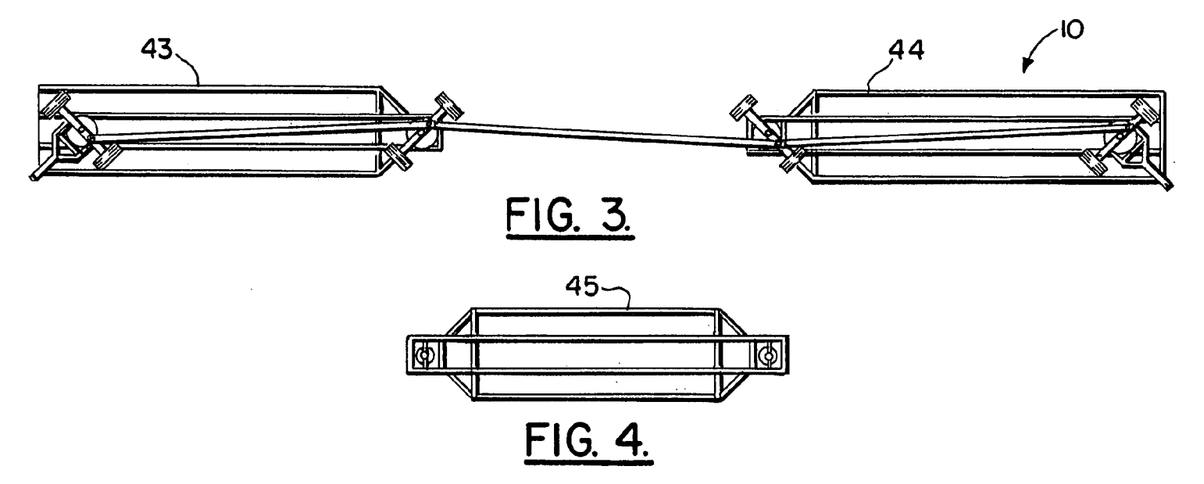
FIG. 3 is a plan view of the preferred embodiment of the apparatus of the present invention showing an elongated chassis configuration for each of the three chassis that form the trailer train.
FIG. 4 is a schematic plan view of the center chassis of the trailer train of FIGS. 3 and 5.

The steering rods must continue from the axle support at one end of the train to the axle at the other end of the train 10 alternating their connection to the axles from left to right as shown in FIGS. 1 and 3, for example.

The size, shape and number of chassis is inconsequential, provided that at each connection of one chassis to another both chassis share the same running gear (axle support, spindles, wheels). This "running gear" is preferably pivoted in line with the pivot point where the two chassis are connected.

A steering rod 31 similarly connects the right side of axle support 24 to the left side of axle support 32. The axle support 32 has spindles 33 with wheels 34 at the end portions of the axle 33 as shown in FIGS. 1 and 2. Pivotal support 35 is used to join axle support 32 to chassis 14.

A steering rod 36 connects the left side of axle support 32 to the right side of axle support 38. Axle support 38 has spindles 39 that have wheels 42. Steering rod 36 extends from pivotal connection 37 on the left side of axle support 32 to pivotal connection 41 on the right side of pivotal connection 40. Wheels 42 are provided at end portions of axle support 38 on spindles 39 as shown in FIGS. 1 and 2.

Figure 5:
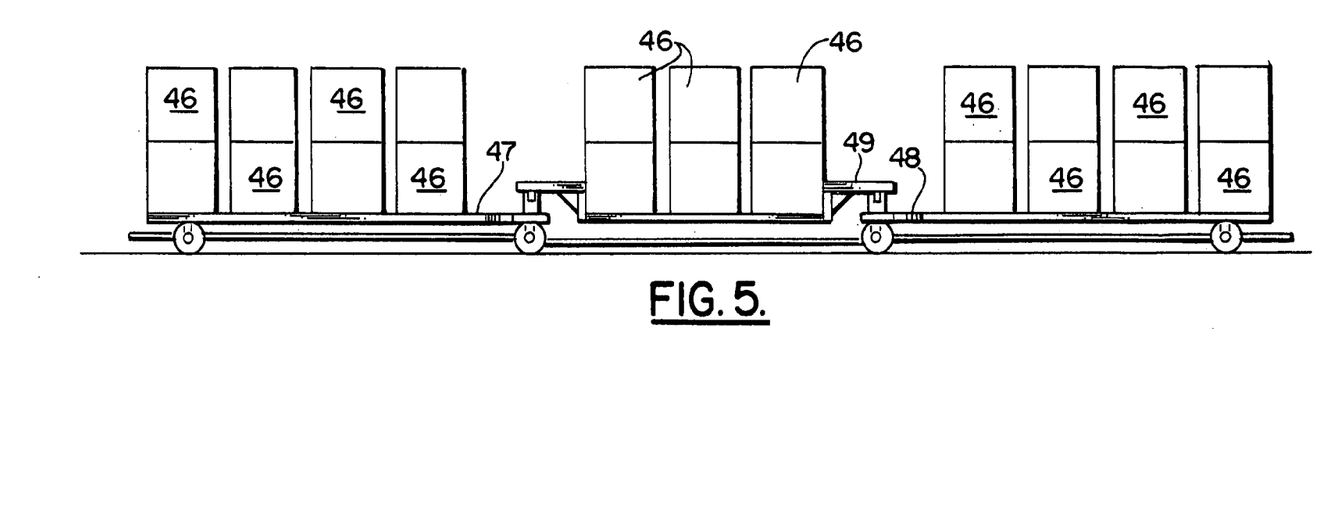
FIG. 5 is an elevation view of a trailer train that has elongated chassis, a pair of wheeled end chassis, and a center wheelless chassis.

FIGS. 3, 4 and 5 illustrate that an elongated chassis 43, 44, 45 can be used, wherein the length of each chassis is much greater than its width.

In FIGS. 3–5, cargo modules 46 are loaded on platform 47, 48, 49 of chassis 43, 44 and 45 respectively. The elevation of each of the platforms 47, 48 and 49 can be about equal as shown in FIG. 5.

In FIGS. 6 and 7, four and five chassis trailer trains 11, 12 are shown respectively. In FIG. 6, the trailer train 11 includes a first chassis 50, second chassis 51, third chassis 52, and fourth chassis 53. The second chassis 51 is a wheelless chassis. The first chassis 50 has steerable wheels 54 and 56 that are connected with steering rods in the same fashion as the chassis 13 that was shown and described with respect to FIGS. 1, 2 and 3. The chassis 51 is wheelless. The chassis 52 has front and rear pairs of wheels 57 and 58 respectively that are steered using connecting rods that span between the wheels 57 and 56 and their wheel supports in the same fashion as connecting rod 31 in FIG. 1. The chassis 53 has one set of wheels 59 connected by an axle and an axle support. A trailer tongue 60 can be used to steer the wheels 59 in the same fashion that the tongues 16 and 17 steer the wheels 22 and 42 respectively in FIGS. 1 and 2. However, the chassis 53 has only one set of wheels 59 as it is partially supported by chassis 52 to which it is pivotally connected at 19.

A pivotal connection 18 joins the chassis 50 and 51. A pivotal connection 19 joins the chassis 51 and 52. A pivotal connection 19 joins the chassis 52 and 53.

In FIG. 7, a trailer train 12 includes five chassis 50, 51, 52, 54 and 63. In FIG. 7, the chassis 51 and 54 are wheelless chassis. The chassis 50, 51 and 52 can be configured in the same fashion as the chassis 50, 51 and 52 of FIG. 6.

The chassis 54 is a wheelless chassis that rests upon the chassis 52 and 63, being connected to each of them with pivotal connections. A pivotal connection 18 joins the chassis 50 and 51. A pivotal connection 19 joins the chassis 51 and 52. A pivotal connection 19 joins the chassis 52 and 54. A pivotal connection 18 joins the chassis 54 and 63. The chassis 63 has front and rear pairs of wheels 60, 61 and can be of the same construction as the end chassis 13 and 14 of FIGS. 1 and 2.

Figure 8:
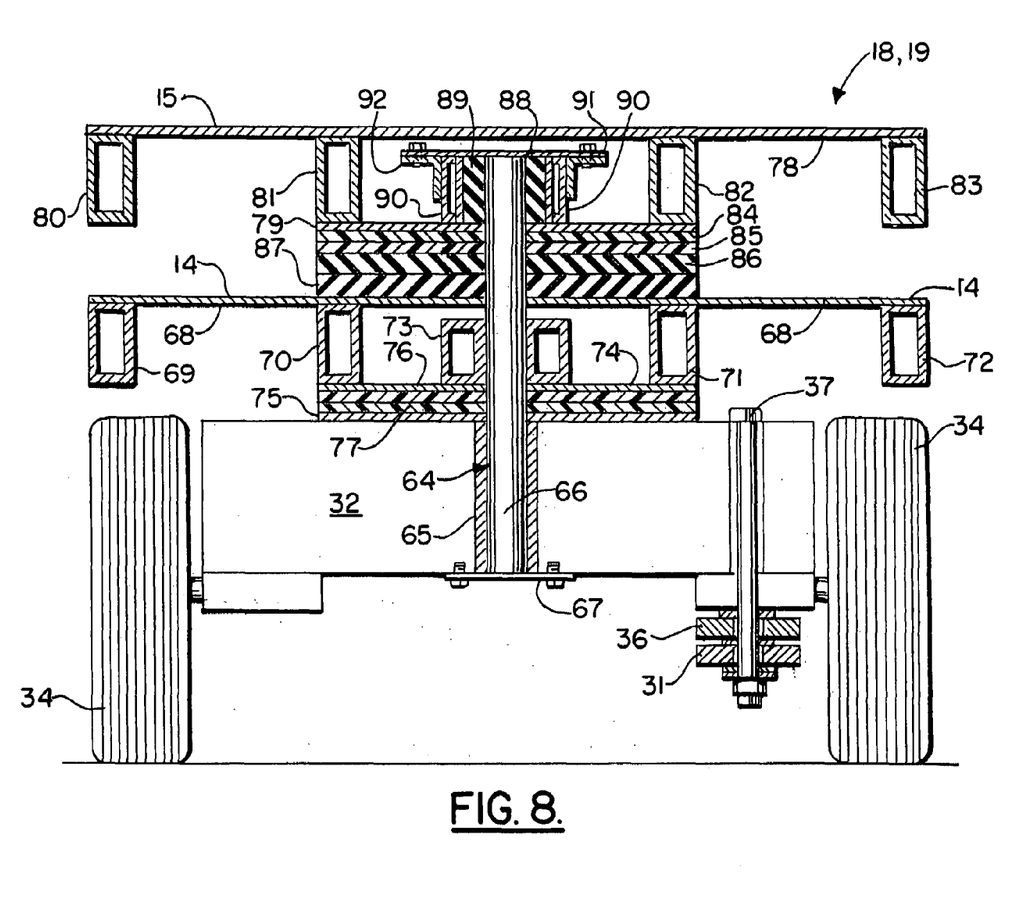
FIG. 8 is a sectional view taken along lines 8—8 in FIG. 2.

FIG. 8 provides a detailed view of the pivotal or rotating connection 18 or 19 that joins one chassis (e.g. 13 or 14) to another chassis (e.g. 15). Chassis 15 axle support 32 has a vertical opening 64 that can be lined with vertical sleeve 65. Vertical shaft 66 has plate 67 welded or otherwise connected to its lower end portion as seen in FIG. 8. Plate 67 is connected (e.g. bolted) to axle support 32.

Chassis 14 can include deck 68 that rests upon longitudinal beams 69, 70, 71, 72. Beams 70, 71 and annular support 73 rest upon plate 74. Plate 75 rests upon axle support 32. Polymeric disks 76, 77 for a load bearing interface between plates 74, 75.

Chassis 15 can include deck 78 that rests upon a plurality of longitudinal beams 80, 81, 82, 83. Beams 81, 82 rest upon plate 79. A plurality of polymeric disks 84, 85, 86, 87 form a load bearing interface between plate 79 and deck 68. Each disk 84, 85, 86, 87 has an opening that receives shaft 66.

Cap 88 attaches to plate 79 and covers the upper end portion of shaft 66. Polymeric sleeve 89 is contained within cap 88 and surrounds the upper end portion of shaft 66. Sleeve 89 is surrounded by annular support 90 that can be attached (e.g. welded) to plate 79. Cap 88 can include plate 91 that is bolted to or otherwise connected to annular flanged member 92.

In FIGS. 9–11B, trailer train 93 has a plurality of chassis 94, 95, 96. Chassis 94 is an end chassis having tongue 97. End chassis 96 has tongue 98. As with the embodiments of FIGS. 1–8, the tongues 97, 98 enable the trailer train 93 to be towed in either of two directions.

Figure 9:
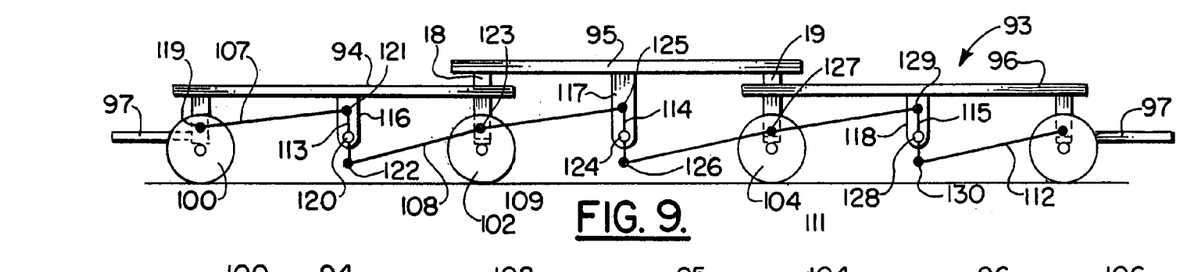
FIG. 9 is an elevation view of a second embodiment of the apparatus of the present invention.
Figure 10:
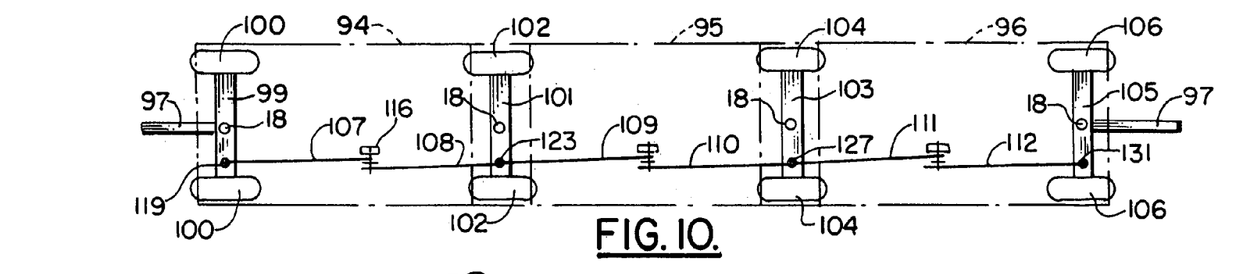
FIG. 10 is a plan view of the second embodiment of the apparatus of the present invention.

Tongue 97 attaches to axle support 99. Axle support 99 is provided with a pair of opposed wheels 100. Axle support 101 also attaches to chassis 94 at a pivotal connection such as the connection 18 or 19 shown in FIG. 8. Axle support 101 has wheels 102. Chassis 95 is a wheelless chassis that attaches to each of the end chassis 94, 96 with the connection such as shown in FIG. 8. Chassis 96 has axle supports 103, 105. The axle support 103 is equipped with wheels 104. The axle support 105 is equipped with wheels 106.

In the embodiment of FIGS. 9–11B, pushrods 107–112 are employed for steering the axle supports. Pushrod 107 attaches to axle support 99 at pivotal connection 119 as shown in FIG. 10. The underside of chassis 94 provides a crank support 116 to which crank 113 pivotally attaches at pivotal connection 120. Pushrod 107 attaches to an upper end portion of crank 113 at pivotal connection 121. Pushrod 108 attaches to the lower end portion of crank 113 at pivotal connection 122. Pushrod 108 also attaches to axle support 101 at pivotal connection 123. A pushrod 109 joins axle support 101 to crank 114 at pivotal connection 125. The pushrod 109 attaches to axle support 101 at pivotal connection 123. Cranks 113, 114 are pivotally attached to their respective crank supports 116, 117 using pivotal connections 120, 124 respectively.

Chassis 96 provides a crank support 118 that pivotally supports crank 115. Pushrod 111 attaches at one end portion to axle support 103 at pivotal connection 127. Pushrod 111 attaches to crank 115 at pivotal connection 129. Pushrod 112 pivotally attaches at pivotal connection 130 to the lower end portion of crank 115. Crank 115 pivotally attaches to support 118 at pivotal connection 128. Pushrod 112 attaches to axle support 105 at pivotal connection 131.

Figures 11A, 11B:
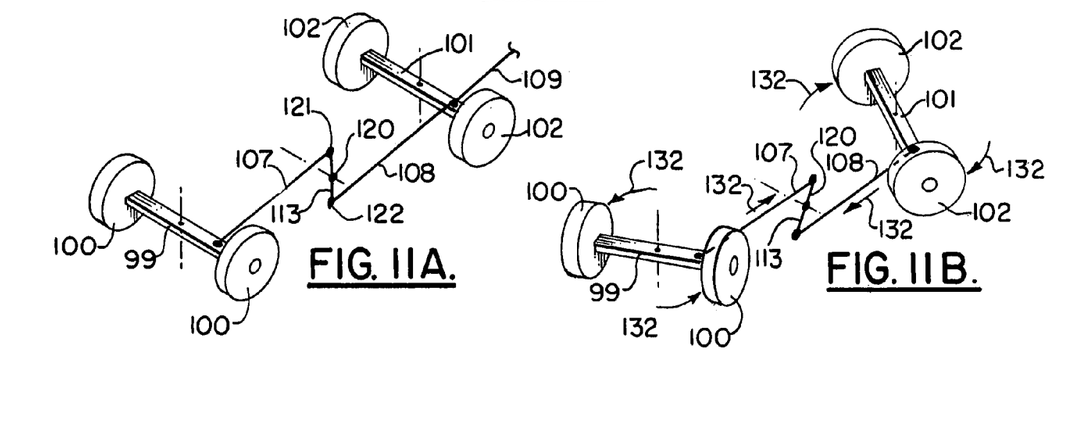
FIG. 11a is a partial perspective view of the second embodiment of the apparatus of the present invention showing the front and rear axles generally parallel.
FIG. 11b is a partial perspective view of the alternate embodiment of the apparatus of the present invention showing the front and rear axles angled with respect to one another.

In FIGS. 11A and 11B, a schematic diagram shows the positioning of pushrods 107, 108, 109 relative to wheels 100, 102 in a nonsteering position (FIG. 11A) such as when the trailer train 93 is traveling in a straight direction and in a steering position (FIG. 11B) wherein the trailer train is executing a turn. In FIG. 11B, arrows 132 illustrate movement of the respective front and rear wheels 100, 102 of chassis 94 and the positioning of pushrods 107, 108 and crank 113.

Figure 12:
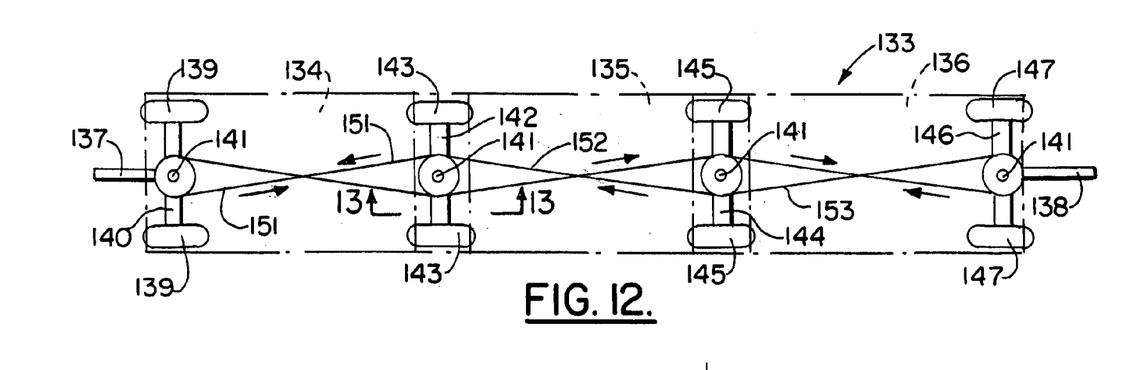
FIG. 12 is a plan view of a third embodiment of the apparatus of the present invention.
Figure 13:
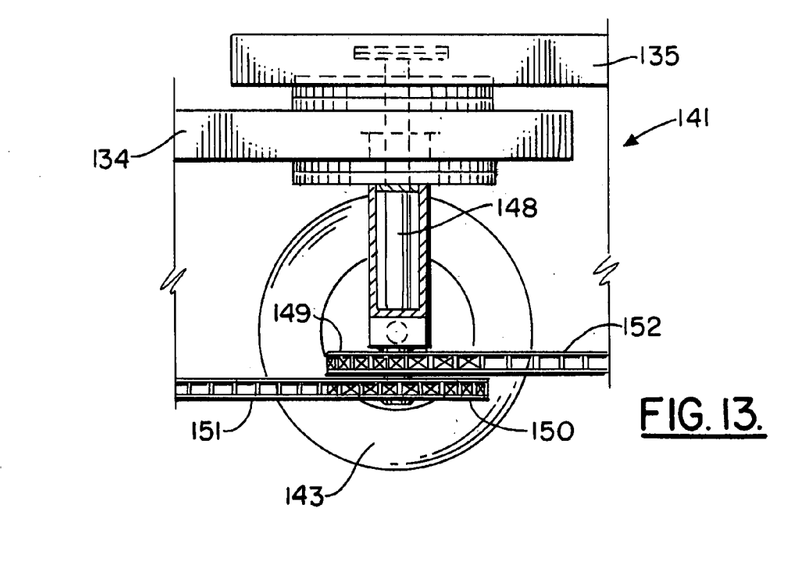
FIG. 13 is a sectional view taken along lines 13—13 of FIG. 12.

In FIGS. 12 and 13, an alternate embodiment of the apparatus of the present invention is shown, designated generally by the numeral 133. Trailer train 133 includes an end chassis 134, central chassis 135, and end chassis 136. Chassis 134 has tongue 137. Chassis 136 has tongue 138. Axle support 140 pivotally attaches to chassis 134 at pivot 141. The pivot 141 can include a shaft 148 and a plurality of disks, much in the same fashion which is shown with respect to the embodiment of FIGS. 1–8.

In FIGS. 12 and 13, the lower end portion of the shaft 148 that joins two chassis 134, 135 or 135, 136 together is fitted with a pair of sprockets, including an upper sprocket 149 and a lower sprocket 150. For the pivot 141 next to tongue 137 or 138, a single sprocket 149 is provided. Each axle support 140, 142, 144, 146 is provided with a pair of wheels. The wheels are shown in FIG. 12 as 139, 143, 145, 147. A first endless chain 151 joins lower sprocket 150 with the single sprocket of pivot 141 associated with axle 140 and tongue 137. As with the preferred embodiments, tongue 137 can be attached to and rotate with axle support 140. When the axle support 140 and tongue 137 are rotated, endless chain 151 likewise rotates the lower sprocket 150 of the pivot 141 associated with axle support 142. A second endless chain 152 forms an interface between upper sprocket 149 associated with axle support 142 and the upper sprocket 149 associated with axle support 144. A third endless chain 153 forms an interface between the lower sprocket 150 associated with axle support 144 and the single sprocket associated with axle support 146. In this fashion, when the trailer train 133 is steered using either tongue 137 or 138, all of the other axle supports are steered as well. The train 133 can thus execute smooth turns while being pulled in either direction by tongue 137 or 138.

The apparatus 10, 11 and 12 shown and described can each be towed from either end. The apparatus 10, 11, 12 provide multiple chassis as part of trains 10, 11 or 12 that can be steered with front and rear steerable wheels.

PARTS LIST

The following is a list of suitable parts and materials for the various elements of the preferred embodiment of the present invention.

| Parts No. | Description |
|---|---|
| 10 | trailer train |
| 11 | trailer train |
| 12 | trailer train |
| 13 | chassis |
| 14 | chassis |
| 15 | chassis |
| 16 | tongue |
| 17 | tongue |
| 18 | pivot |
| 19 | pivot |
| 20 | axle support |
| 21 | spindle |
| 22 | wheel |
| 23 | pivotal connection |
| 24 | axle support |
| 25 | spindle |
| 26 | wheel |
| 27 | pivotal connection |
| 28 | steering rod |
| 29 | pivotal connection |
| 30 | pivotal connection |
| 31 | steering rod |
| 32 | axle support |
| 33 | spindle |
| 34 | wheel |
| 35 | pivotal connection |
| 36 | steering rod |
| 37 | pivotal connection |
| 38 | axle support |
| 39 | spindle |
| 40 | pivotal connection |
| 41 | pivotal connection |

-continued

| Parts No. | Description |
|---|---|
| 42 | wheel |
| 43 | elongated end chassis |
| 44 | elongated end chassis |
| 45 | elongated center chassis |
| 46 | cargo module |
| 47 | platform |
| 48 | platform |
| 49 | platform |
| 50 | first chassis |
| 51 | second chassis |
| 52 | third chassis |
| 53 | fourth chassis |
| 54 | wheel |
| 55 | tongue |
| 56 | wheel |
| 57 | wheel |
| 58 | wheel |
| 59 | wheel |
| 60 | tongue |
| 61 | wheel |
| 62 | tongue |
| 63 | fifth chassis |
| 64 | vertical opening |
| 65 | sleeve |
| 66 | shaft |
| 67 | plate |
| 68 | deck |
| 69 | be am |
| 70 | beam |
| 71 | beam |
| 72 | beam |
| 73 | annular support |
| 74 | plate |
| 75 | plate |
| 76 | disk |
| 77 | disk |
| 78 | deck |
| 79 | plate |
| 80 | beam |
| 81 | beam |
| 82 | beam |
| 83 | beam |
| 84 | disk |
| 85 | disk |
| 86 | disk |
| 87 | disk |
| 88 | cap |
| 89 | sleeve |
| 90 | annular support |
| 91 | plate |
| 92 | annular flanged member |
| 93 | trailer train |
| 94 | end chassis |
| 95 | center chassis |
| 96 | end chassis |
| 97 | tongue |
| 98 | tongue |
| 99 | axle support |
| 100 | wheel |
| 101 | axle support |
| 102 | wheel support |
| 103 | axle support |
| 104 | wheel |
| 105 | axle support |
| 106 | wheel |
| 107 | pushrod |
| 108 | pushrod |
| 109 | pushrod |
| 110 | pushrod |
| 111 | pushrod |
| 112 | pushrod |
| 113 | crank |
| 114 | crank |
| 115 | crank |
| 116 | crank support |
| 117 | crank support |
| 118 | crank support |

-continued

| Parts No. | Description |
|---|---|
| 119 | pivotal connection |
| 120 | pivotal connection |
| 121 | pivotal connection |
| 122 | pivotal connection |
| 123 | pivotal connection |
| 124 | pivotal connection |
| 125 | pivotal connection |
| 126 | pivotal connection |
| 127 | pivotal connection |
| 128 | pivotal connection |
| 129 | pivotal connection |
| 130 | pivotal connection |
| 131 | pivotal connection |
| 132 | arrow |
| 133 | trailer train |
| 134 | end chassis |
| 135 | center chassis |
| 136 | end chassis |
| 137 | tongue |
| 138 | tongue |
| 139 | wheel |
| 140 | axle support |
| 141 | pivot |
| 142 | axle support |
| 143 | wheel |
| 144 | axle support |
| 145 | wheel |
| 146 | axle support |
| 147 | wheel |
| 148 | shaft |
| 149 | upper sprocket |
| 150 | lower sprocket |
| 151 | endless chain |
| 152 | endless chain |
| 153 | endless chain |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A trailer train apparatus comprising:
a) a train that includes plurality of trailers, each having a chassis and plurality of wheels attached to the chassis with front and rear steerable wheel supports, the trailers being connected end-to-end at trailer connection pivots;
b) each support being attached to its chassis at pivotal connections, each wheel support having respective left and right side portions that are on opposite sides of the pivotal connection;
c) a plurality of links that attach to the trailers including a first link that attaches to the left side of a wheel support of a first trailer and to the right side of a wheel support of an adjacent, second trailer and a second link that attaches to the left side of a wheel support of a third trailer and to the right side of a wheel support of the second trailer; and
d) two of said plurality of trailers at opposing ends of said connected plurality having trailer tongues that enable the train to be towed by pulling either one of the tongues.

2. The trailer train apparatus of claim 1 wherein the links include a plurality of pushrods.

3. The trailer train apparatus of claim 2 wherein the chassis has a periphery and both supports extend beyond the periphery.

4. The trailer train apparatus of claim 1 wherein each tongue is connected to a support.

5. The trailer train apparatus of claim 1 further comprising a beam that defines the support and carries each wheel on a spindle.

6. The trailer train apparatus of claim 5, wherein the beam is pivotally connected to the chassis.

7. The trailer train apparatus of claim 1, wherein each chassis has a generally rectangular periphery.

8. The trailer train apparatus of claim 1, wherein each chassis has front and rear edge portions and left and right side portions, and a periphery, wherein said edge and side portions defining the chassis periphery.

9. The trailer train apparatus of claim 8, wherein at least one support is mounted within the periphery.

10. The trailer train apparatus of claim 8, wherein both axles are mounted within the periphery.

11. The trailer train apparatus of claim 1 further comprising a carriage that is attached to a pair of wheeled carriages in between said pair of wheeled carriages.

12. A trailer train apparatus comprising:
a) a train that includes plurality of trailers, each having a chassis and at least some trailers having a plurality of wheels attached to the trailer chassis with front and rear steerable wheel supports, the trailers being connected end-to-end at trailer pivotal connections;
b) each wheel support is attached to its chassis at one of said pivotal connections, each wheel support having respective left and right side portions that extend to opposite sides of a said pivotal connection;
c) a plurality of links that connect between the wheel supports, each link being configured to rotate adjacent wheel supports in opposite rotational directions;
d) two of said plurality of trailers at opposing ends of said connected plurality having trailer tongues that enable the train to be towed by either of the tongues; and
e) wherein the each link extends from one side of a wheel support to an opposing side of another wheel support each link in sequence attaching to the same side of a wheel support as the link closest to it.

13. The trailer train apparatus of claim 12 wherein the chassis has a periphery and at least one wheel is positioned to extend beyond the periphery.

14. The trailer train apparatus of claim 12 wherein the chassis has a periphery and both wheels extend beyond the periphery.

15. The trailer train apparatus of claim 12 wherein each tongue is connected to an axle.

16. The trailer train apparatus of claim 12 wherein each wheel support includes a beam that carries an axle.

17. The trailer train apparatus of claim 16, wherein the beam is pivotally connected to the chassis.

18. The trailer train apparatus of claim 12, wherein each chassis has a generally rectangular periphery.

19. The trailer train apparatus of claim 12, wherein each chassis has front and rear edge portions and left and right side portions, and a periphery, and said edge and side portions defining the chassis periphery.

20. The trailer train apparatus of claim 12, wherein at least one axle is mounted within the periphery.

21. The trailer train apparatus of claim 12, wherein both axles are mounted within the periphery.

22. The trailer train apparatus of claim 12 further comprising a carriage that is not wheeled that is attached to a pair of wheeled carriages in between said pair of wheeled carriages.

23. The trailer train apparatus of claim 1 wherein at least one of the trailers is a wheelless trailer.

24. The trailer train apparatus of claim 12 wherein at least one of the trailers is a wheelless trailer.

25. The trailer train apparatus of claim 1 wherein the trailer connection pivots that connect trailers together are in line with the pivotal connections.

26. The trailer train apparatus of claim 12 wherein the trailer connection pivots that connect trailers together are in line with the pivotal connections.

27. A trailer train apparatus comprising:
a) a train that includes plurality of trailers, each having a chassis with a periphery and at least some trailers having front and rear steerable wheeled support, at least one trailer having no wheels, the trailers being connected end-to-end at trailer connection pivots;
b) each wheeled support is attached to its chassis at one of the trailer pivots, each wheeled support having respective left and right side portions that are on opposite sides of a pivotal connection;
c) linkage that joins each axle support to another axle support in a manner that steers other of the axle supports when one of the axle supports is steered; and
d) at least one of said plurality of trailers of said connected plurality having a trailer tongue that is connected to an axle support, enabling the train to be towed and one of the axle supports to be steered; and
e) wherein the each link extends from one side of a wheel support to an opposing side of another wheel support, each link in sequence attaching to the same side of a wheel support as the link closest to it.

28. The trailer train apparatus of claim 27 wherein the chassis has a periphery and at least one wheel is positioned to extend beyond the periphery.

29. The trailer train apparatus of claim 27 wherein the chassis has a periphery and both wheels extend beyond the periphery.

30. The trailer train apparatus of claim 27 wherein each tongue is connected to an axle support.

31. The trailer train apparatus of claim 27 further comprising a beam that is part of an axle support.

32. The trailer train apparatus of claim 31, wherein the beam is pivotally connected to the chassis.

33. The trailer train apparatus of claim 27, wherein each chassis has a generally rectangular periphery.

34. The trailer train apparatus of claim 27, wherein each chassis has front and rear edge portions and left and right side portions, a chassis periphery, said edge and side portions defining the chassis periphery.

35. The trailer train apparatus of claim 27, wherein at least one axle support is mounted within the periphery.

36. The trailer train apparatus of claim 27, wherein a plurality of the axle supports are mounted within the periphery.

37. The trailer train apparatus of claim 27 further comprising a carriage that is not wheeled that is attached to a pair of wheeled carriages in between said pair of wheeled carriages.

38. The trailer train apparatus of claim 27 wherein at least one of the trailers is a wheelless trailer.

39. The trailer train apparatus of claim 27 wherein the trailer connection pivots that connect trailers together are in line with the axle pivotal connections.

* * * * *